United States Patent [19]

Torneback

[11] Patent Number: 5,080,443
[45] Date of Patent: Jan. 14, 1992

[54] ANTI-SKID DEVICE

[76] Inventor: Goran Torneback, 1-238 East 21st Street, North Vancouver, British Columbia V7L 3B6, Canada

[21] Appl. No.: 555,411
[22] PCT Filed: Feb. 8, 1989
[86] PCT No.: PCT/SE89/00050
  § 371 Date: Aug. 30, 1990
  § 102(e) Date: Aug. 30, 1990
[87] PCT Pub. No.: WO89/07533
  PCT Pub. Date: Aug. 24, 1989

[30] Foreign Application Priority Data

Feb. 9, 1988 [SE] Sweden ............................ 88000413-0

[51] Int. Cl.⁵ .............................................. B60B 15/00
[52] U.S. Cl. ................................. 301/6 R; 301/41 R; 188/4 B
[58] Field of Search .............. 152/208, 214, 215, 216; 301/6 R, 41 R, 42; 280/757; 180/16, 4 B

[56] References Cited

U.S. PATENT DOCUMENTS

| | | |
|---|---|---|
| 374,252 | 4/1921 | Thorne . |
| 2,241,923 | 5/1941 | Ridgway ........................... 188/4 |
| 2,442,322 | 5/1948 | Daley ............................... 188/4 B |
| 2,747,691 | 5/1956 | Lakey et al. ..................... 188/4 |
| 2,815,826 | 12/1957 | Schaefer ........................... 188/4 |
| 2,865,471 | 12/1958 | Chaussee ......................... 188/4 B |
| 4,299,310 | 11/1981 | Torneback et al. ............. 188/4 |
| 4,567,118 | 4/1987 | Andersson ....................... 188/4 |
| 4,621,712 | 11/1986 | Hardmark ....................... 188/4 |
| 4,732,239 | 3/1988 | Hardmark et al. ............. 188/4 |
| 4,840,399 | 6/1989 | Rieger et al. ................... 152/208 X |

FOREIGN PATENT DOCUMENTS

| | | |
|---|---|---|
| 0211798 | 7/1986 | European Pat. Off. . |
| 0197202 | 10/1986 | European Pat. Off. . |
| 266487 | 11/1912 | Fed. Rep. of Germany . |
| 3100975 | 12/1981 | Fed. Rep. of Germany . |
| 7521268 | 1/1986 | Fed. Rep. of Germany . |
| 8521267 | 1/1986 | Fed. Rep. of Germany . |
| 8526271 | 1/1986 | Fed. Rep. of Germany . |
| 3526356 | 1/1987 | Fed. Rep. of Germany . |
| 78039963 | 10/1979 | Sweden . |
| 23033 | of 1908 | United Kingdom ................ 188/4 B |

OTHER PUBLICATIONS

Brochure: "Instachain-The First Pushbutton Snowchain" published prior to Nov. 10, 1981.

Primary Examiner—Russell D. Stormer
Attorney, Agent, or Firm—Banner, Birch, McKie & Beckett

[57] ABSTRACT

A mounting apparatus for an anti-skid device for vehicles comprises an arm flexible essentially in one plane, fixed to the vehicle, and in its free end carrying a rotatable pulley which at its periphery has chain pieces attached thereto. The arm comprises a plurality of positioning elements fixed to a contracting member and enclosing at least one resilient tie member which, in a neutral position, gives the arm an arched shaped. When a pull line is activated the positioning elements form a rigid stack, whereby the pulley is moved down and pressed against one of the wheels of the vehicle.

5 Claims, 3 Drawing Sheets

ANTI-SKID DEVICE

BACKGROUND OF THE INVENTION

The present invention relates to an anti-skid device, preferably an anti-skid device of a kind comprising a pulley provided with chain pieces which is brought to rotate when bearing on the side of a vehicle wheel, whereby the chain pieces, due to rotating of the pulley, are successively thrown between the wheel and the ground.

Anti-skid devices of the above-mentioned kind are known, particularly for heavy trucks and for trucks of ordinary size. To achieve a proper function of the anti-skid device, it is necessary that the point where the pulley is in contact with the vehicle wheel be capable of being adjusted vertically and horizontally and that the proper pressure between the pulley and the wheel be achieved.

In SE 8501021-3 an anti-skid device for smaller trucks is disclosed, which device has a certain adjustability but comprises many parts. In addition, for moving the pulley from a resting position to a working position, a relatively large space is required, because the pulley must be moved to a resting position where the chains are well above the ground.

European Patent Publication No. 162823 describes a special shelf provided for buses and similar vehicles having limited space. The shelf collects the chains and keeps them free of the ground. The construction comprises additional parts to be located and adjusted into the system in order to obtain the desired function. The shelf is prone also to collect dirt.

Characteristic of the mentioned devices is that their design is relatively complicated; they are expensive to make; and their use can be adapted only to larger vehicles.

SUMMARY OF THE INVENTION

The object of the present invention is to provide an anti-skid device of the above-metioned kind which can be easily adapted for mounting and use on heavier trucks, as well as on smaller vans and cars, and which device, without need for large space, permits moving the pulley to a resting position where the chains are captured and kept well above the ground.

Another object of the invention is to achieve a construction that is resistant to moisture and dirt.

A further object of the invention is to achieve a device of the described kind having a simple construction.

These objects are achieved in a preferred embodiment of the present invention in which a fixing device, attached to the vehicle, carries an arm, flexible essentially in one plane, to the end of which a pulley carrying chains is rotatably attached, the arm comprising a number of positioning elements each consisting of a body of a hard material with at least a first and a second contact surface arranged to diverge at their front end from each other, permitting the first contact surface of a positioning element to be brought into contact in a fixed position with second contact surface of an adjacent element, said positioning elements being held together at their back ends by a contracting means and enclosing at least one resilient means which, in a first position, when the contracting means is in a curved resting position, causes the elements to diverge from each other and in a second position, when a first pulling means acts against the force of the resilient means and the contracting means, the contact surfaces of the elements interact and form a rigid stack.

In another embodiment of the invention there is a second pulling means extending through the wedge-shaped part of the positioning elements, which pulling means, when activated, keeps the wedge-shaped parts of the positioning elements together so that a curved stack is obtained.

The mentioned embodiments have the positioning elements, the contracting means and the resilient means encapsulated in a tight elastic cover. Furthermore, there are means that capture and fix the chains in the resting position of the device. Common to all of the embodiments is the fact that the fixing device, which fixes the arm to the vehicle, is adjustable so that a proper contact point between the pulley and the wheel can easily be obtained.

BRIEF DESCRIPTION OF THE DRAWINGS

The invention will now be described with reference to the accompanying drawings.

DETAILED DESCRIPTION

Figure 1:
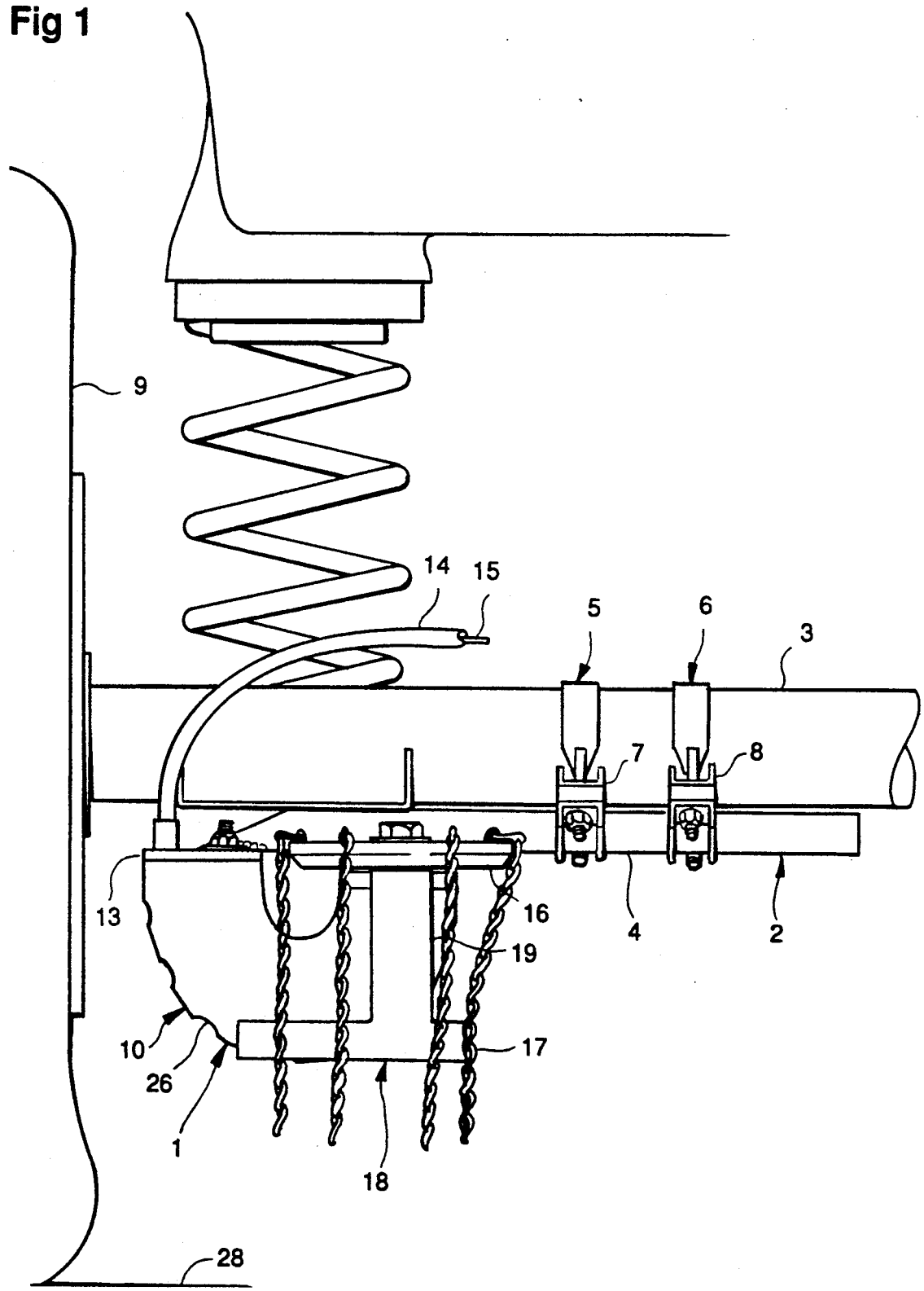
FIG. 1 shows the device in a resting position.
Figure 2:
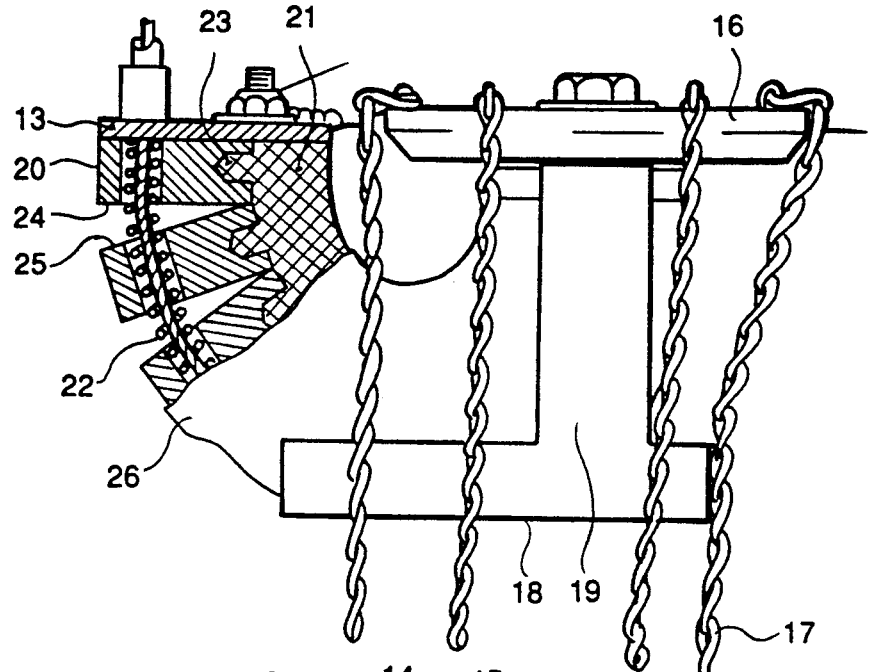
FIG. 2 shows an enlarged partial section of the device shown in FIG. 1.

FIGS. 1 and 2 show the device 1 mounted on a vehicle shaft with the fixing device 2 attached to the axle tube 3 interiorly of the wheel 9. It is also possible to mount a fixing device, of another kind (not shown) to the points of fixation of the springs and the shock absorbers.

The fixing device has an elongated body 4 comprising a tube or a bar. The body 4 is fixed to the axle tube 3 of the vehicle by means of two clamps 5 and 6, which fasten the body 4 and press the lower parts, 7 and 8, of the clamps against the shaft tube of the vehicle. Thus, when the clamps 5 and 6 are loose, the body 4 is adjustable horizontally, as well as vertically, and can also be turned. When the clamps are tightly fixed, on the other hand, the body 4 is fastened to the axle tube of the vehicle. Thus, the contact point between the pulley 16 and the vehicle wheel 9 can easily be adjusted.

At the end of the elongated body 4, which is directed toward the wheel 9, a plate 13 is attached. In this plate 13 the arm 10 is rotatably mounted. The plate 13 also attaches a bowden cable 14 through which a pulling line 15 extends. The pulling line 15 connected for operation to a power generating device mounted on the vehicle (not shown). Around the arm 10 a preferably U-shaped magnetic body 18 is provided by which the chains are captured when the device is in its resting position. The magnetic device 18 is provided with a clamp 19 positioned between the pulley 16 and the outermost positioning element 20.

The arm 10 comprises a plurality of positioning elements 20, made of a hard material. The positioning elements 20 are, at their one end, held together by a contracting means 21. At least one resilient means, such as the elongated coil spring 22, extends through all of the positioning elements 21. When the arm 10 rests against the plate 13 and the attachment of the pulley 16 is in the neutral position, the arm becomes curved, in that the positioning elements 20, as viewed from the contracting means 21, are caused to diverge from each other. The positioning elements 20 each have a projecting part 24 and a cavity 25 in their respective oppositely facing surfaces. From the power generating device mentioned above, at least one pulling line 15 extends through holes in the positioning elements 20 where the ends of each of the pulling lines 15 is fixed in the outermost positioning element.

In another preferred embodiment (not shown) the first pulling line is a strong ribbon, for instance a textile ribbon, which is attached to the outermost positioning element and which ribbon extends along and outside the ends of the positioning elements that are directed from the contracting means 21, to the earlier mentioned power generating device in the vehicle. The arm 10, comprising the positioning elements 20, the contracting means 21, the first pulling line 15 and the resilient means 22, is encapsulated in an elastic cover 26, preventing dampness and dirt to come through and jeopardize the function of the device. The pulley 16 with its chain pieces 17 is rotatably mounted on the outermost positioning element of the arm 10. In this element the clamp 19 is also mounted.

In FIGS. 1 and 2 the device is shown in its resting position when the resilient means 22 is in its neutral position. In this position the arm 10 becomes curved so that the pulley 16 is turned and lifted upwardly to an elevated position such that the ends of the chains 17 will be an adequate distance from the ground. In this position also, the pulling line 15 is released allowing the arm 10 to assume this shape. The magnetic means 18, which is provided in the outermost positioning element 20 and partially embraces the arm 10, will catch the swinging chains when the vehicle moves and prevent them from producing undue sound.

Figure 3:
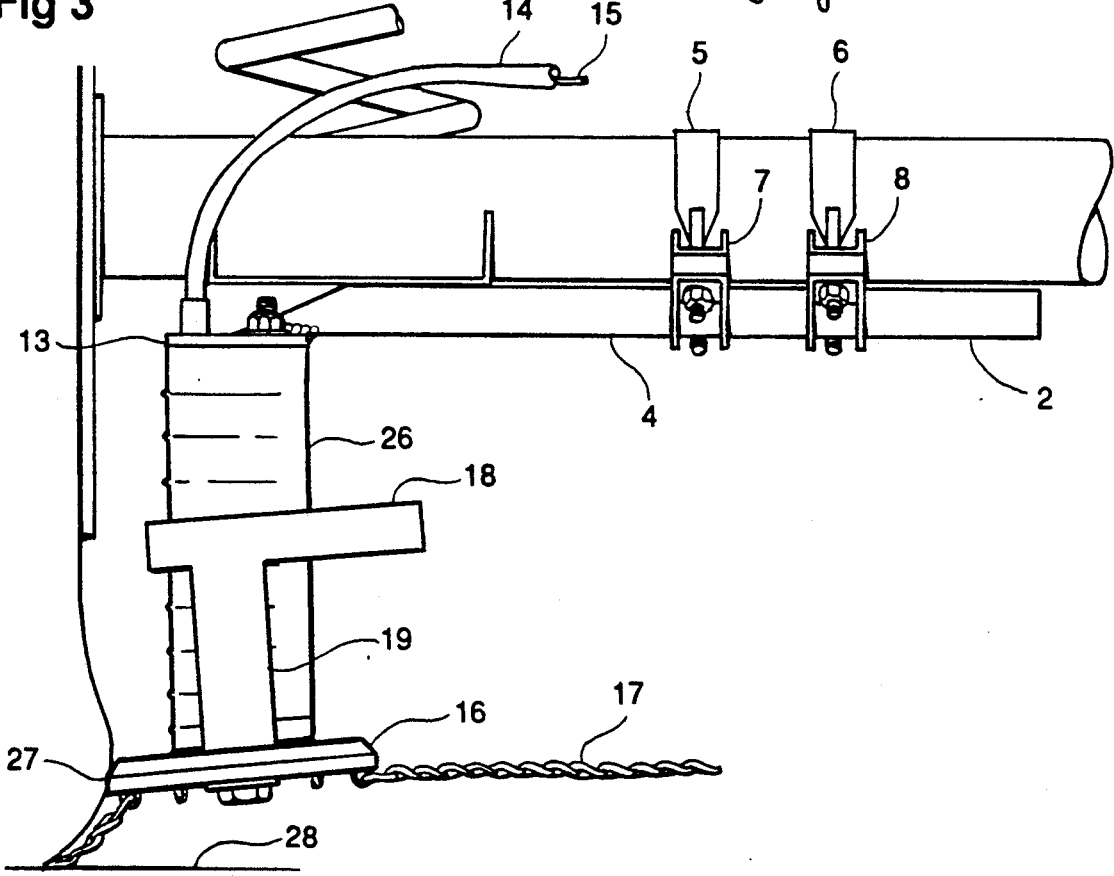
FIG. 3 shows the device in a working position.

In FIG. 3 the device is shown in its working position. When the pulling line 15 is activated by the power generating device in the vehicle, the spring 22 is contracted so that the surfaces of the positioning elements will be caused to press against each other. The projecting parts 24 on each positioning element 20 are caused to mate with the cavity 25 on the adjacent element so that a twist-and-bend-resistant rigid stack is obtained. The pulley 16 is thus pressed against the side of the vehicle wheel at a point 27 located on a line between the axis of the shaft and the contact point between the wheel and the ground closely or behind such line. The pulley 16 will then be caused to rotate by the vehicle wheel 9 and the chains are thrown by centrifugal action between the wheel and the ground whereby skidding is hindered.

It is important that the contact point between the pulley 16 and the vehicle wheel be so located that no undesirable forces are imposed on the device, such as, for example, pulling forces in the chains. Determining the accurate contact point, as already mentioned, can be performed by adjusting the fixing device 2.

Figure 4:
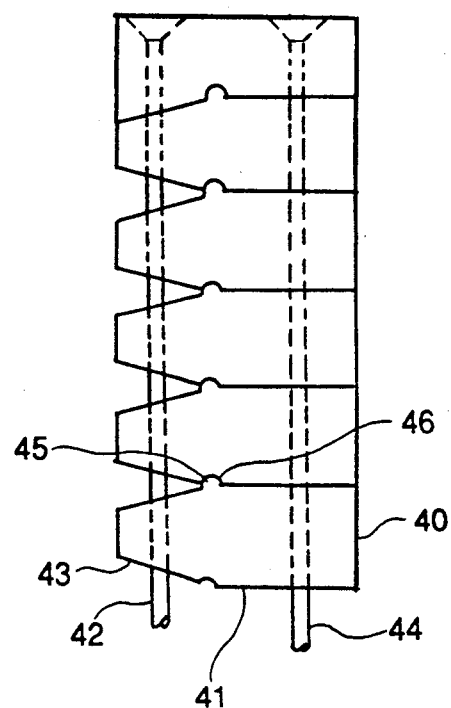
FIG. 4 shows, in working position, a device with two pulling apparatus.
Figure 5:
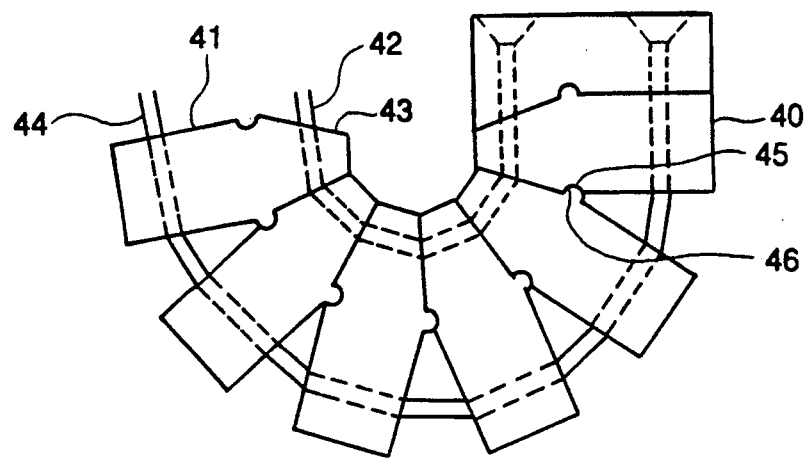
FIG. 5 shows the device of FIG. 4 in its resting position.

FIGS. 4 and 5 show the principles of another embodiment of the arm in which the positioning elements 40 have an alternative shape in that one part 41 has essentially plane parallel surfaces which when pressed together by a first pulling device 44, form an essentially straight stack as shown in FIG. 4. The other part 43 of the positioning elements 40 has surfaces converging toward the end of the elements, which elements, when the surfaces or pressed together by a second pulling means 42, form an arched as is evidence from FIG. 5.

The described invention is adapted to act as an apparatus for moving an anti-skid device for a vehicle between a resting postion and a working position but can, of course, be adapted to act in other tasks, e.g., moving a tool or the like into different positions relative to a fixed point.

I claim:

1. A mounting appartus for an anti-skid device of the kind which includes a pulley provided with chain pieces, said pulley being caused to rotate by bearing on the side of a vehicle wheel whereby the chain pieces, when the wheel and thereby the pulley rotates, are successively thrown between the wheel and the ground, characterized in that a fixing device attached to the vehicle carries an arm that is flexible essentially in one plane, to the free end of which the pulley is rotatably attached, the arm comprising a plurality of positioning elements each including a hard material having at least a first and a second contact surface arranged to diverged at their front end from each other to permit the first contact surface of a positioning element to be brought into contact, in a fixed position, with the second contact surface on an adjacent element, said positioning elements being held together at their back end by a contracting means and enclosing at least one resilient means which, in a first position when the contracting means is in a curved resting position, forces the elements to diverge from each other, and in a second position when a first pulling means acts against the force of the resilient means and the contracting means, forces the contact surfaces of the elements in to interact and form rigid stack.

2. A device according to claim 1, characterized in that the positioning elements each have a third and a fourth contact surface that create a wedge-shaped part, emanating from the element part that comprises the first and the second contact surfaces, said contact surfaces defining such a wedge angle that, when a second pulling means, which runs through the wedge-shaped part of the positioning element, is activated, the positioning elements will be pressed so that the positioning elements form an arched rigid stack.

3. A device according to any one of claim 1 or claim 2, characterized in that the stack is enclosed by an elastic cover, shutting out moisture and dirt.

4. A device according to any one of claims 1 or claim 2, characterized in that an essentially U-shaped magnetic means has a clamp fastened to the free end of the arm, such clamp being of a length that the magnetic means is located a distance from the downwardly turned side of the pulley when the pulley is in its resting position.

5. A device according to any one of claims 1 or claim 2, characterized in that the fixing comprises an elongated body and at least one clamping means for securing said body to an axle tube of the vehicle and being effective to render the body turnable and horizontally and vertically displaceable along the axle tube of a vehicle.

* * * * *